Aug. 25, 1925.
R. WELCKER
1,551,080
TRANSPORTATION OF SOLID MATERIALS IN BULK FORM
Filed Nov. 23, 1921       2 Sheets-Sheet 1
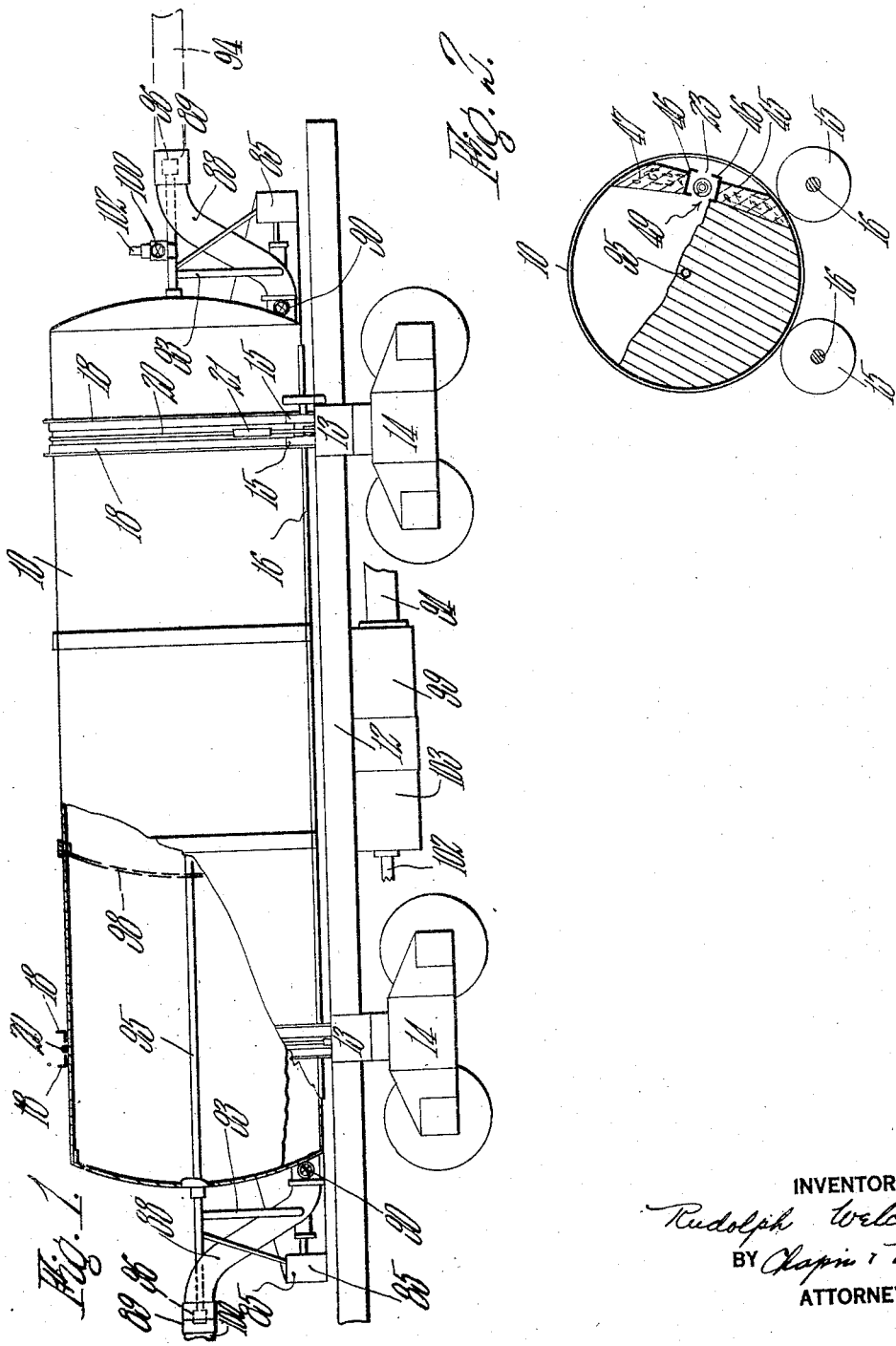
INVENTOR
Rudolph Welcker
BY Chapin + Neal
ATTORNEYS Aug. 25, 1925.
R. WELCKER
1,551,080
TRANSPORTATION OF SOLID MATERIALS IN BULK FORM
Filed Nov. 23, 1921    2 Sheets-Sheet 2
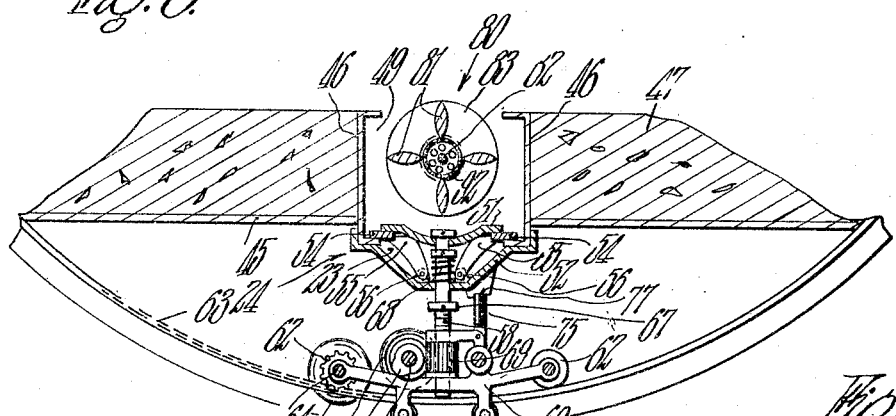
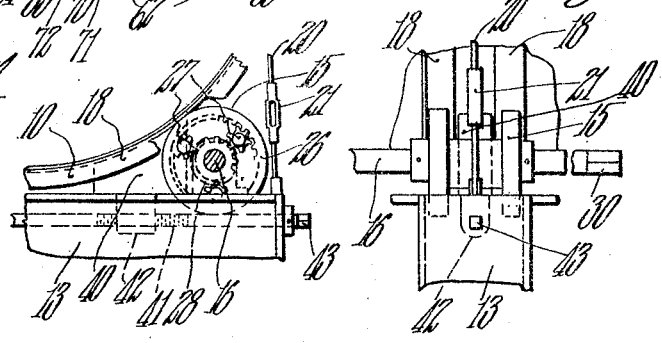
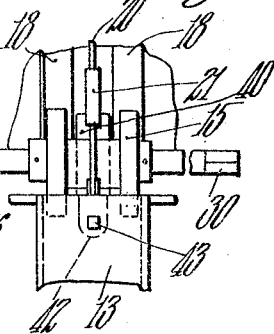
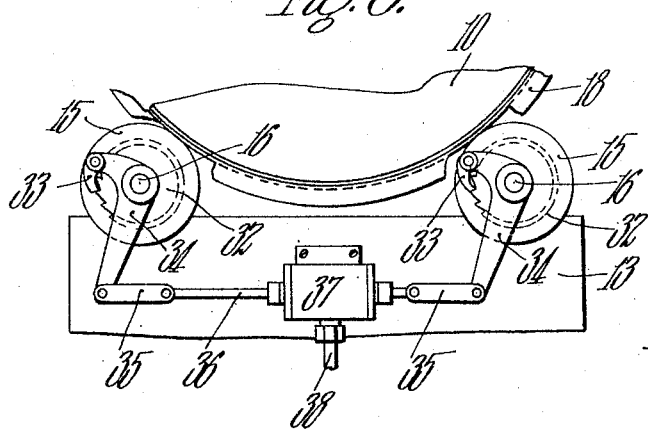
INVENTOR
Rudolph Welcker
BY Chapin & Neal
ATTORNEYS Patented Aug. 25, 1925.

1,551,080

UNITED STATES PATENT OFFICE.

RUDOLPH WELCKER, OF SPRINGFIELD, MASSACHUSETTS.

TRANSPORTATION OF SOLID MATERIALS IN BULK FORM.

Application filed November 23, 1921. Serial No. 517,400.

*To all whom it may concern:*

Be it known that I, RUDOLPH WELCKER, citizen of the United States, residing at Springfield, in the county of Hampden and State of Massachusetts, have invented new and useful Improvements in Transportation of Solid Materials in Bulk Form, of which the following is a specification.

The present invention relates broadly to the transportation in bulk of various commodities of granular or pulverized form, such, for example, as grain, cereals, cement, sand and coal, as well as other kinds of solid material in a more or less finely divided state.

More particularly the invention relates to cars, trucks, or the like, for transporting material in bulk form, and it is especially concerned with the provision of means for facilitating the loading of such material into the car or other transportable container and the unloading of the material therefrom.

In accordance with methods heretofore employed for transporting solid material in bulk form, it has been necessary to install elaborate and expensive equipment at terminal stations for the purpose of loading the material into the cars or other medium of transportation and for unloading the material therefrom after it has been transported. The loading and unloading operations have required the employment of unskilled labor to a large extent and the operations have been necessarily slow and expensive.

The main object of the present invention is to provide radical improvements relating to the transportation of materials in bulk form for the purpose of effecting marked economy of time, labor and expense in the handling thereof, as well as avoiding the use of expensive terminal equipment.

With this object in view, the invention comtemplates the provision of a self contained unit comprising a transportable container for solid material in bulk form and means enabling said container to be loaded from a source of supply located either closely adjacent thereto or remote therefrom and to be unloaded into a receptacle or the like located either near said container or more or less distant therefrom. By employing a self contained unitary device such as above described, no special loading or unloading equipment is necessary at the terminals and the container may be readily loaded or unloaded at any point along its line of travel.

While the invention is herein illustrated and described as embodied in a railway car, the practical utility of the invention is not limited to railway transportation but may be equally applicable for use in connection with automobile trucks or so called industrial trucks such as are used in manufacturing establishments for distributing supplies or other materials.

Another object of the invention is to provide certain improvements in the construction of cars or other transportable containers for facilitating the loading or unloading of the same by gravity.

To this end, the invention contemplates the provision, in a car or truck having a body provided with an opening for the introduction of the material to be transported and its subsequent discharge at an unloading station, of means for supporting said body constructed and arranged to permit movement of the latter relatively to its support from a normal or loading position in which said opening is located at the top of the body to receive said material, to an unloading position in which said opening is located at the bottom of the body for the discharge of the material therefrom. Preferably, as shown, the car body comprises an elongated cylindrical tank horizontally disposed and mounted upon rollers for rotation about its longitudinal axis.

In connection with the above feature, the present invention contemplates the provision of means for locking the car body against rotation to maintain it in normal position during the loading and transporting of the material and for unlocking it prior to the unloading operation.

The invention further contemplates the provision of means, actuated either manually or by power at the will of an operator, whereby the car body may be rotated to bring said opening into a discharging position. As the car body is thus rotated, the discharge of the material through said opening commences substantially as soon as the inclination of the plane of said opening exceeds the angle of repose of the material within said body. An important feature of the invention consists in so constructing the means for rotating the car body that after the discharge of the material has commenced, the rotation of said body may be continued at the will of the operator to complete the unloading of the material and to enable the rate of discharge to be under the control of the operator. In practice, the rotation of the car body will be continued until the discharge opening is located at the bottom of the body when the unloading operation will be completed.

To insure against possible injury to the contents of the car from moisture and to enable the car body to be rendered air tight so that auxiliary means may be employed in connection therewith for effecting pneumatic loading or unloading of the car, a further object of the invention is to provide effective and reliable means for hermetically sealing the opening whereby the car is adapted for gravity loading and unloading operations.

Other objects of the invention are to provide for pneumatically loading a transportable container with material to be transported, and to provide for pneumatically discharging said material from said container.

A further object of the invention is to provide, in a car, truck, or the like of the general character above described, mechanical means, adapted for use in connection with either the gravity or pneumatic unloading operations, for assisting the discharge of the material from the body of the car or truck.

With these and other objects in view, as will hereinafter appear, the invention consists in the features of construction and in the combinations and arrangements of parts set forth in the following description and particularly defined in the appended claims.

The invention will best be understood from a description of the preferred embodiment thereof illustrated in the accompanying drawings, in which:—

Fig. 1 is a view, partially in side elevation and partially in section, of a railway car constructed in accordance with the present invention;

Fig. 2 is a transverse sectional view of the car body in a position which it assumes during the unloading operation;

Fig. 3 is a transverse sectional view of a portion of the car body illustrating particularly the mechanism for opening and closing the aperture through which the gravity loading and unloading operations are effected;

Fig. 4 is a detail elevational view showing a portion of the mechanism for rotating the car body;

Fig. 5 is an end elevational view of the parts shown in Fig. 4; and

Fig. 6 is an end elevational view of the mechanism for rotating the car body.

Referring to the drawings, the car body 10 therein shown consists of an elongated cylindrical tank which is horizontally disposed above a supporting frame comprising the usual longitudinal beams 12 and transverse members or bolsters 13, the latter being mounted upon the usual trucks 14. The side of the car body or tank 10 rests upon a plurality of rollers 15 which are mounted above the bolsters 13. As shown the rollers 15 are disposed in pairs upon horizontal shafts 16 that are arranged parallel to the longitudinal axis of the car body and are journaled in suitable journal boxes supported by the bolsters. The rollers 15 bear against the axially disposed flanges of angle iron bands 18 which encircle the tank 10. The bands 18 are disposed in pairs to provide tracks for the rollers 15 and the bands of each pair are relatively positioned with their radially disposed flanges projecting from the outer edges of the bands to embrace between them the individual rollers of each pair and thus to prevent longitudinal displacement of the car body. To prevent transverse displacement of the car body, suitable straps 20 extend around the body between the bands 18, the straps being secured at their opposite ends to the bolsters 13 at opposite sides of the car body and being provided with suitable turn-buckles 21 for adjusting the length of the straps.

The tank or body 10 is provided with an opening 23 which extends longitudinally through the side wall of the tank from one end thereof to the other, and is normally closed by means of a closure or cover which is indicated generally at 24 (Fig. 3) and is removable to enable the tank to be loaded or unloaded by gravity. The tank 10 is rotatable to move the opening 23 from a receiving position at the top of the tank to a discharging position at the bottom of the tank. Instead of a single opening 23 extending throughout the length of the tank, a plurality of openings may be arranged in longitudinal alinement and adapted to be closed by separate covers.

To enable the tank to be rotated, the supporting rollers 15 are rotatably mounted upon their respective shafts 16 and are severally provided with internal gear teeth 26 (Fig. 4). The teeth 26 of each roller 15 are connected through planetary gearing 27 with the respective shaft 16. The shafts 16 may be squared at their ends, as indicated at 30 in Fig. 5, to receive a wrench by which said shafts may be manually turned to effect the rotation of the tank 10.

Provision is also made for rotating the tank 10 by power. To this end each shaft 16 has secured thereon, adjacent one of the bolsters 13, a ratchet wheel 32 the teeth of which are engaged by a feed pawl 33 pivotally mounted upon a carrier 34 that is mounted to oscillate upon the shaft 16. The lower extremities of the pawl carriers 34 are connected by links 35 with the opposite ends of a piston rod 36 which projects beyond the opposite ends of a cylinder 37. The cylinder 37 is adapted to receive compressed air through an inlet conduit 38 and is provided with a double acting piston and a suitable valve construction to enable the piston to be reciprocated when air is supplied to the cylinder so that the shafts 16 and rollers 15 will be turned intermittently by the described pawl and ratchet mechanism and thus the tank 10 will be rotated.

To firmly support the tank 10 while the car is in transit and to relieve the rollers 15 of part of the weight of the tank, wedge members 40 are provided upon the upper face of each bolster 13 at opposite sides of the longitudinal center of the tank. The upper faces of the wedge members 40 are inclined to engage the cylindrical side wall of the tank 10 and they are adapted to be moved into and out of supporting engagement with the tank by means of an operating rod 41 which extends horizontally through the bolster and is provided with right and left screw-threads which are threaded through depending ears 42 on the two wedge members respectively. One or both ends of the operating rods 41 may project beyond the ends of the bolster 13 and the projecting ends may be squared, as shown at 43 to receive a crank or wrench for turning said rod to actuate the wedge members. When adjusting the wedge members in operative position, it may be found desirable to tighten the turn buckles so as to bind the tank between the straps and the wedge members.

As shown in Figs. 2 and 3, the opening 23 is formed in a flattened portion 45 of the cylindrical wall of the tank 10 between two longitudinally extending channel beams 46. To provide a wall flush with the inner flanges of the channel beams 46 the space between said channel beams and the nearest portions of the cylindrical side wall of the tank is filled in with concrete as shown at 47. Without some such arrangement, material might become trapped adjacent the outer sides of the channel beams 46 and thus be retained within the tank at the finish of the unloading operation. With the described construction, however, all the material may escape freely from the tank, passing first through the elongated channel 49 (Fig. 3) that is formed between the channel beams 46 and then through the opening 23.

Before describing the gravity loading and unloading operations, the construction of the closure 24 will be set forth as well as the mode of actuating the same to open or close the opening 23. Besides being adapted to be loaded and unloaded by gravity, the car body or tank 10 is also provided with means enabling it to be loaded or unloaded by pneumatic means, as will hereinafter appear. To enable such pneumatic loading or unloading operations to be carried on, however, it is essential that the tank shall be made air tight and accordingly it is necessary to provide a cover for the opening 23 which may be closed so as to hermetically seal said opening. With this end in view, the closure 24 is constructed as will now be explained.

As shown in Fig. 3, the cover or closure 24 comprises two parts, an inner cover 51 and an outer cover 52. The inner cover 51 is of less width than the opening 23 in order that it may be inserted and withdrawn therethrough. For the purpose of cooperating with the cover 51 to seal the opening 23, a pair of sealing strips 54 are arranged to be interposed between said cover and the adjacent longitudinal edges of the channel beams 46 after the cover has been inserted into the channel 49 and while it is being moved outwardly into operative position. The outer cover 52 is constructed to overlap the outer flanges of the channel beams 46 and is adapted to be moved inwardly into engagement therewith.

For conveniently operating the covers 51 and 52 and also the sealing strips 54, any suitable means may be provided. As shown, the strips 54 are carried by several pairs of arms 55 which are pivoted at 56 to the inner face of the cover 52 and both covers 51 and 52 are carried by a plurality of radial operating shafts 58 that are severally supported upon carriages 60, the latter being adapted for movement at right angles to the length of the opening 23 to move the covers 51 and 52 bodily to one side after they have been opened and the inner cover has been withdrawn from the opening 23. To this end, each carriage 60 is provided with a plurality of rollers 62 which are adapted to engage the inner and outer sides of the horizontal flanges of the angle iron bands 18 which encircle the tank 10 adjacent opposite ends thereof and at opposite sides of each carriage 60. To effect the sidewise movements of the covers, each carriage is provided with a pinion 62 which meshes with an internal rack segment 63 on the horizontal flange of one of the adjacent bands 18 and in order that the pinions may be actuated in unison they are secured upon a single shaft 64 which extends between the carriages 60 and is journaled therein. The shaft 64 is turnable by means of a hand wheel 65.

To enable the covers to be opened and closed each operating shaft 58 is swiveled in the inner cover 51 and a collar 67, which is fixed to said shaft outside of the cover 52 is normally held in engagement with said cover by the action of a spring 68, the latter encircling said shaft between the two covers. The portion of each shaft 58 projecting outwardly beyond the collar 67 has threaded thereon a worm gear or nut 69 which is adapted to be rotated by a worm 70, the several worms being fixed upon a single shaft 71 that is journaled in bearings on the carriages and is turnable by means of a hand wheel 72. By turning the hand wheel 72 in one direction, the two covers 51 and 52 may be moved inwardly in unison, to project the inner cover through the opening 23 and to seat the outer cover against the outer faces of the channel beam flanges at opposite sides of said opening.

To lock the outer cover in closed position one or more lock bars 75 are loosely pivoted at one end upon the carriages 60 and are adapted to engage shoulders 77 on said cover. Normally the lock bars 75 are latched in inoperative position by any suitable means (not shown) which may be manually released when desired. When the covers are to be closed, the tank is in loading position with the opening 23 located at the top thereof. Consequently after the outer cover has been seated against the channel beams and the lock bars have been unlatched the latter will swing by gravity into position behind the shoulders 77.

After the outer cover has thus been locked in closed position, the hand wheel 72 is turned in the opposite direction to move the inner cover outwardly against the force of the spring 68. As the inner cover thus moves outwardly its inner side engages cam surfaces 79 on the pivoted arms 55 and swing the latter away from each other so as to spread apart the strips 54 until they are brought into the operative positions shown in Fig. 3, wherein said cover is tightly held against the sealing strips 54 while the latter are tightly held against the inner faces of adjacent inturned flanges of the channel beams 46. During this outward movement of the inner cover, the outer cover is locked in closed position by the lock bars 75. The covers may be opened by reversing the operations just described.

To effect the gravity loading of the car, the car body is positioned with the opening 23 at the top thereof and the car is moved to such position that said opening 23 will be located beneath a chute leading from a bin or other receptacle in which the material to be transported is stored. The closure 24 is then opened and moved to one side as above described. The material is then delivered by the chute through the opening 23 into the car body until the latter is filled after being loaded, the closure 24 is replaced to close the opening 23 and the car is then ready to transport the material to its destination.

When it is desired to unload the car by gravity the closure 24 is removed and the tank is rotated to enable the material to flow by gravity through the opening 23. This discharge of the material will begin substantially as soon as the plane of said opening becomes disposed at an angle greater than the angle of repose of the material within the car body. The rotation of the car body will be continued in the same direction as fast as necessary to maintain a continuous discharge of material, the last of the material being discharged when the opening 23 becomes positioned at the bottom of the tank. It will be seen that the discharge of the material is thus at all times under the control of the operator who may effect a slow or rapid discharge as may be desired by diminishing or increasing the speed of rotation of the car body.

To assist the discharge of the material through the opening 23, a power-actuated agitator device 80 is provided which serves to loosen and stir up the material within the passage 49. This agitator device 80 consists of elongated rotatable paddle wheels each comprising a plurality of paddle blades or vanes 81 which are angularly disposed with respect to a central shaft 82, the latter extending longitudinally through the channel 49 from one end of the car body to the other and projecting through said ends where it is suitably journaled for rotation. The blades 81 extend longitudinally of the shaft 82 and each blade consists of a plurality of sections arranged in longitudinally alinement with their ends secured to supporting disks 83 which are keyed to the shaft 82. If found to be desirable, suitable bearings for the shaft may be provided between adjacent disks of the agitator sections. The shaft 82 is adapted to be driven by means of compressed air motors 85 one of which is provided at each projecting end of said shaft and supplied with compressed air as will be hereinafter explained.

In order that the car body or tank may be loaded pneumatically, provision is made for first exhausting the air from the empty tank so as to produce a partial vacuum therein and then establishing communication between the interior of the tank and a pipe leading from the source of supply of the material to be loaded. To this end, pipe connections 88 (Fig. 1) lead outwardly from the opposite ends of the tank 10, said connections communicating with the interior of the tank at points adjacent the side walls of the tanks and in alinement with each other. The connections 88 are joined with stationary pipes leading either to an air exhausing apparatus or to a source of supply of the material to be loaded, and to enable the tank together with said connections to rotate freely, said connections are offset to bring their free extremities into coaxial relation with the tank and suitable coupling devices 89 are provided at said free extremities for connecting the latter with the stationary pipe lines or with the offsets of other cars which may be coupled with the car herein described to form a train of cars. The pipe connections or offsets 88 are provided with suitable valves 90 for closing the passage therethrough when desired.

To enable the tank 10 to be loaded pneumatically, one pipe connection or offset 88 may be coupled to a pipe line leading to an air exhausting apparatus (not shown) which may be mounted independently of the car, or said offset may be connected by a flexible conduit 94 with an air exhausting apparatus 99 carried by the frame of the car. The other offset 88 may have coupled thereto a conduit 100 which may be employed to conduct the material to the tank from a source of supply.

The conduit 100 may be flexible and of sufficient length to enable the material to be loaded from a point considerably distant from the car. When not in use, the conduits 94 and 100 may be coiled and carried by the car so as to be available whenever they may be needed. To load the car, said conduits are properly connected with the tank and the exhausting apparatus, the cover 24 and the valve 90 in the last mentioned offset 88 are closed, and the other valve 90 is opened. The exhausting apparatus is then operated to produce a vacuum in the tank 10. Then by reversing the condition of the valves 90, the material may be forced through the conduit 100 and into the tank by atmospheric pressure. The relative positions of the conduits 94 and 100 may be reversed to enable the loading to be effected from the opposite end of the car.

In order that the contents of the car body may be pneumatically discharged provision is made for building up pressure within the closed car body so that the material therein will be forced out through one or the other of the pipe connections or offsets 88. To this end a perforated pressure distributing pipe 92 extends longitudinally through the channel 49, said pipe enclosing the agitator shaft 82 and having its walls spaced therefrom to provide a conduit for compressed air or other fluid under pressure. The pipe 92 may be made in sections stationarily mounted in axial alinement between the disks which support the agitator blades. To establish communication between the sections of the distributing pipe 92, the disks 83, as well as the bearings between said disks, may be perforated as shown in Fig. 3. The distributing pipes 92 are adapted to be supplied with compressed air by means of feeder pipes 93 which extend through the walls of the offsets 88 and are connected with opposite ends of the distributing pipes. The feeder pipes 93 are supplied from a single supply pipe 95 which extends axially through the tank 10, projecting beyond either end thereof and being rotatable therewith. The projecting portion of the supply pipe 95 at each end of the latter, projects through the wall of the adjacent offset 88, and extends in coaxial relation with the latter to a point where it is provided with a coupling member 96. By means of either one of the coupling members 96 the pipe 95 may be connected with a supply pipe (not shown) which may lead to an independent air compressor, or the pipe 95 may be connected with a similar pipe in another car which may be coupled to the car herein described. Also, by means of a suitable valve connection such as shown at 101, said pipe 95 may be connected to a conduit 102 leading to an air compressor 103 that is carried by the car frame. When pressure has been built up in the tank 10, by the compressor 103, the offset 88 at either end of the car may be employed to convey the material from the car and deliver it at a point of discharge which may be more or less remote from the car. Obviously, if pressure is built up in the tank 10 by means of a compressor connected with the pipe 95 through one of the coupling members 96, the offset 88 at the opposite end of the car will be employed to discharge the material from the car.

When discharging pneumatically, as when loading pneumatically, the cover 24 is kept closed. The tank is rotated until the material therein slides by gravity into the channel 49 and thus into the axial plane of the inner ends of the offsets 88. By admitting compressed air to the distributing pipe 92 and opening the valve 90 in one of the offsets 88, the material within the car body will be forced outwardly through said offset as fast as it enters the channel 49. Obviously by regulating the rotation of the tank 10 the rate of discharge of the contents thereof may be advantageously controlled and the discharge may be stopped if desired at any time before the car is completely unloaded. The agitator device 80 may be used if desired to assist the pneumatic discharge as well as to assist the gravity discharge as before explained.

The tank 10 may be provided with transverse partition walls, such as indicated at 98 in Fig. 1, dividing the tank into separate chambers for the material to be transported. When the tank is thus provided with partition walls the supply pipe 95 may be rigidly secured to said partitions and to the end walls of the tank, and it will then serve as a tie rod reinforcing the tank against the pressure within it. The partition walls will, of course, be provided with ports whereby communication will be established between adjacent sections of the tank along the line of the channel 49.

From the foregoing description it will be clear that a car constructed in accordance with the present invention may be loaded either by gravity or by the establishment of a vacuum within the car body and that the car body may be unloaded either by gravity or by the pressure of compressed air or other compressible fluid aided by gravity which acts to feed the material into the current of air as the tank is rotated. Local conditions at the loading stations will determine the relative merits of the different methods of loading and unloading the cars. The unloading of the material, in any case, may be properly controlled by regulating the rotation of the tank and thus feeding the proper quantity of material into the current of air which is under compression and is moving toward the discharge port. The rotating agitator device may be used to loosen the material in the tank and thus help to insure a constant discharge of the same. When a plurality of cars constructed as hereinbefore described and embodying the above described pneumatic system are coupled together in the form of a train, the adjacent ends of the offsets 88 and supply pipes 95 may also be coupled together so that the car bodies may be progressively connected with a single air compressor merely by the operation of suitable valves without the necessity of making special air pipe connections for each car. Advantageously, an air compressor and an air exhauster may be carried upon a car at the front end of the train and either the compressor or the exhauster may be connected with all of the cars.

It is obvious that a great saving of labor may be effected by using the type of car herein described, and that direct deliveries of materials may be brought about without waste or possibility of injury of the materials by moisture. A further saving will result from the elimination of bags, barrels, shipping cases or the like which will be effected when goods are shipped in bulk by means of cars of the above described type.

While it is preferred to employ the specific construction and arrangement of parts herein illustrated and described it is to be understood that such construction and arrangement is not essential except so far as defined in the appended claims and may be changed or modified in various respects without departing from the spirit of the invention.

I claim:

1. A self-contained unit for use in the transportation of solid material in bulk form having, in combination, a transportable body, a container for the material movably mounted thereon, and means including a conduit communicating with the interior of said container, for loading the material therein from a remote source of supply and for discharging said material at a point remote from said container.

2. A self-contained unit for use in the transportation of solid material in bulk form having, in combination, a transportable body, an air tight container for the material movably mounted thereon, air compressing and exhausting mechanism, connections between said mechanism and said container whereby the former may be rendered operative to increase or diminish the pressure within the latter, and a conduit in communication with said container and operative when the pressure in the latter is diminished to convey material thereto from a remote point of supply and when the pressure therein is increased to convey material therefrom to a remote point of discharge.

3. A self-contained unit for use in the transportation of solid material in bulk form having, in combination, a rotatable body for containing the material to be transported, means for supporting said body and enabling it to be transported, auxiliary means operable by fluid pressure for carrying material from a point remote from said body and loading it into the body and for unloading material from the body and discharging it a point remote therefrom, and means for rotating the body to facilitate the unloading operation.

4. In combination, a transportable body, a container mounted thereon for relative movement and adapted to be moved to facilitate the loading and unloading thereof by gravity action, and auxiliary means to effect the loading and unloading of said container, operable independently or in conjunction with the movement of said container.

5. In combination, a transportable body, a container mounted thereon for relative movement and adapted to be moved to facilitate the loading and unloading thereof by gravity action, and means operable by fluid pressure to effect the loading and unloading of said container.

6. In combination, a transportable body, a container mounted thereon for relative movement and adapted to be moved to facilitate the loading and unloading thereof by gravity action, and means operable by fluid pressure to effect the loading and unloading of said container, operable independently or in conjunction with the movement of said container.

7. In combination with a hollow container, a supporting body therefor, and means operable by fluid pressure to effect the discharge of its contents, and means for shifting said container to assist the action of said fluid pressure means.

8. In a device of the character described, a hollow body having an opening for the introduction of the material to be transported and for the discharge of said material, said body being normally positioned with said opening located at the top of the body to receive said material, means for supporting said body, controllable means for moving said body to move said opening toward the bottom of the body to cause the material to be discharged therethrough and agitating means for facilitating the discharge of the material.

9. In a device of the character described, a hollow rotatable body having an opening normally located at the top of the body for the reception and discharge of material, means for rotating said body to effect the discharge through said opening of a portion of said material by gravity and for continuing said rotation under the control of the operator to effect the discharge of the rest of the material and pneumatic means for facilitating the discharge of the material.

10. In a device of the character described, a hollow rotatable body adapted to receive material to be transported and having a discharge port therein, means for forcing a current of air under compression through said body and toward said discharge port to carry the material through the latter, and means for rotating the body to feed the material into said current of air.

11. In a device of the character described, a hollow rotatable body adapted to receive material to be transported and having a discharge port therein, means for forcing a current of air under compression through said body and toward said discharge port to carry the material through the latter, means for rotating the body to feed the material into said current of air, and means for stirring up the material as it is being acted upon by said air current.

12. In combination, a transportable body, a container carried thereby and movable relatively thereto, a discharge port provided in said container, means for creating a current of air through said container to carry the material therein through said discharge port, and means for moving said container relatively to said body to feed the material into said current.

13. In combination, a transportable body, a container carried thereby and movable relatively thereto, an opening provided in said container for the introduction or discharge of material, means for moving said container relatively to said body to effect the discharge of material, and auxiliary means to effect the unloading of the material in said container.

14. In combination, a transportable body, a container carried thereby and movable relatively thereto, an opening provided in said container for the introduction or discharge of material, means for moving said container relatively to said body to effect the discharge of material, and means operable by fluid pressure to effect the unloading of the material in said container.

15. In a device of the character described, a body for containing material to be transported said body being provided with an opening for the introduction and discharge of said material, means for supporting said body constructed and arranged to permit movement of the latter relatively to its supporting means from a loading position in which said opening is located at the top of the body to receive said material to an unloading position wherein said opening is located at the bottom of the body to permit the discharge of the material therefrom by gravity, and mechanically actuated means disposed in said opening for assisting such discharge.

16. In a device of the character described, a body for containing material to be transported said body being provided with an opening for the introduction and discharge of said material, means for supporting said body constructed and arranged to permit movement of the latter relatively to its support from a loading position in which said opening is located at the top of the body to receive said material to an unloading position wherein said opening is located at the bottom of the body to permit the discharge of the material therefrom by gravity, an agitator device located within said body adjacent said opening for assisting the discharge of the material, and means for actuating said agitator device.

17. In a device of the character described, a body for containing material to be transported, said body being provided with an opening for the introduction and discharge of said material, means for supporting said body constructed and arranged to permit movement of the latter relatively to its support from a loading position in which said opening is located at the top of the body to receive said material to an unloading position wherein said opening is located at the bottom of the body to permit the discharge of the material therefrom, means for hermetically sealing said opening, and auxiliary loading means including connections between said body and a source of supply of said material and a conduit communicating with the interior of said body and adapted for connection with an air exhausting device.

18. In a device of the character described, a body for containing material to be transported, said body being provided with an opening for the introduction and discharge of said material, means for supporting said body constructed and arranged to permit movement of the latter relatively to its support from a loading position in which said opening is located at the top of the body to receive said material to an unloading position wherein said opening is located at the bottom of the body to permit the discharge of the material therefrom, means for hermetically sealing said opening and auxiliary pneumatic means connected with said body for unloading the material therefrom.

19. In a device of the character described, a body for containing material to be transported, said body being provided with a main opening for use in gravity loading and unloading operations and auxiliary inlet and outlet ports for use in pneumatic loading and unloading operations, means for supporting said body constructed and arranged to permit movement of the latter relatively to its support from a loading position in which said opening is located at the top of the body to receive said material to an unloading position wherein said opening is located at the bottom of the body to permit the discharge of the material therefrom, means for hermetically sealing said opening, and auxiliary means for effecting pneumatically the loading or unloading of the body.

20. In a device of the character described, a body for containing material to be transported, said body being provided with an opening for the introduction and discharge of said material, means for supporting said body constructed and arranged to permit movement of the latter relatively to its support from a loading position in which said opening is located at the top of the body to receive said material to an unloading position wherein said opening is located at the bottom of the body to permit the discharge of the material therefrom, means for hermetically sealing said opening and auxiliary means for enabling said body to be loaded or unloaded without unsealing said opening.

21. In a device of the character described, a truck frame, a hollow cylindrical body having a lateral opening therein, means including a plurality of rollers carried by the truck frame for supporting said body constructed and arranged to permit rotation of the body about its longitudinal axis to move said opening from a receiving position at the top of the body to a discharging position diametrically opposed to said receiving position, and means for actuating said supporting rollers to rotate the body by the driving contact between said rollers and body.

22. In a device of the character described, a hollow cylindrical body having an opening therein for the introduction and discharge of material, a truck, a frame supported by the truck, a plurality of rollers mounted on the frame and constructed and arranged to rotatably support the body by engagement with the outer cylindrical surface thereof, and means for rotating said rollers to turn said body about its longitudinal axis by the driving contact between said rollers and body.

23. In a device of the character described, a hollow cylindrical body having an opening therein for the introduction and discharge of material, a truck, a frame supported by the truck, a plurality of rollers mounted on the frame and constructed and arranged to rotatably support the body by engagement with the cylindrical sides thereof, means for rotating said rollers to turn said body about its longitudinal axis, and means carried by said frame adapted to be positioned in engagement with the lower side of said body to firmly support said body and to relieve the rollers of the weight thereof when the same is not to be rotated.

24. In a device of the character described, a hollow cylindrical body having an opening therein for the introduction and discharge of material, a truck, a frame supported by the truck, a plurality of rollers mounted on the frame and constructed and arranged to rotatably support the body by engagement with the cylindrical sides thereof, means for rotating said rollers to turn said body about its longitudinal axis, and a pair of wedge members arranged beneath said body at opposite sides of its longitudinal axis and mounted for sliding movements in a direction transverse to the length of the body, said members having upper wedge faces shaped to engage the cylindrical sides of the body, an operating shaft having right and left screw-threaded connection with said wedge members for sliding them toward and from each other to render them operative or inoperative, and means for rotating said shaft.

25. In a device of the character described, a rotatable cylindrical tank for containing the material to be transported, a distributing pipe for introducing fluid under pressure into said tank, and pipe connections leading from said tank through which material may be discharged from the tank as said fluid is admitted to said tank to build up pressure therein.

26. In a device of the character described, a rotatable cylindrical tank for containing the material to be transported, perforated pressure distributing pipe extending in an axial direction through said tank adjacent the side wall thereof, an outlet pipe connected with said tank through which material may be discharged from said tank as said fluid is admitted thereto, said pipe leading from its point of connection with the tank to a point where its discharge end is coaxial with said supply pipe and encircles the projecting end thereof, coupling devices for connecting the projecting end of said supply pipe with a relatively stationary supply pipe and for connecting the delivery end of said discharge pipe with a relatively stationary conductor, and means for rotating the tank to maintain the receiving end of the outlet pipe substantially in line with the top surface of the mass of material within said tank as said mass is reduced by the continued discharge thereof from the tank.

27. In a device of the character described, a rotatable cylindrical tank for containing the material to be transported, outlet pipes leading from opposite ends of the said tank at points adjacent the side walls of the latter, said pipes being offset to bring their free ends into coaxial relation with said tank, a rotatable supply pipe for fluid under pressure extending axially through said tank with the ends of said pipe projecting beyond the tank and extending axially through the free ends of the said pipe connections, a perforated pressure distributing pipe extending axially through the opposite ends of said outlet pipes and through the tank coupling devices for connecting the ends of said rotary supply pipe and the free stationary conduits for supplying pressure flint thereto and for connecting said pipe connections with stationary means for supplying thereto material to be loaded into the tank or for exhausting air from the tank, and means for rotating the tank to maintain the receiving end of the outlet pipe substantially in line with the top surface of the mass of material within said tank as said mass is reduced by the continued discharge thereof from the tank.

28. In a device of the character described, a rotatable cylindrical tank for containing the material to be transported and having an axially elongated lateral opening therein for the introduction by gravity of the material to be transported and for the gravity discharge of said material, means for hermetically sealing said opening to enable the tank to be loaded or unloaded by pneumatic means, pipe connections leading from opposite ends of the said tank at points adjacent the side walls of the latter, said pipes being offset to bring their free ends into coaxial relation with said tank, a rotatable supply pipe for fluid under pressure extending axially through said tank with the ends of said pipe projecting beyond the tank and extending axially through the free ends of the said pipe connections, a perforated pressure distributing pipe extending axially through the opposite ends of said outlet pipes and through the tank, coupling devices for connecting the ends of said rotary pipe with stationary conduits for conducting to said connections material to be loaded into the tank or with stationary exhausting devices for creating a vacuum within the tank and for connecting the ends of said rotatable supply pipe with stationary supply pipes, a rotatable shaft within said distributing pipe, agitator blades connected with said shaft, and means for rotating said shaft to operate the agitator blades to mechanically assist the dicharge by gravity or by pneumatic means of the contents of the tank.

29. In a device of the character described, a hollow cylindrical body having an opening therein for the introduction and discharge of material, a truck, a frame supported by the truck, a plurality of rollers mounted on the frame and constructed and arranged to rotatably support the body by engagement with the cylindrical sides thereof, wedge members for engaging beneath said body at opposite sides of its longitudinal center to support the body and relieve said rollers of the weight thereof, and means for actuating said wedge members.

In testimony whereof I have affixed my signature.

RUDOLPH WELCKER.